United States Patent [19]

Dexheimer

[11] Patent Number: 4,830,263

[45] Date of Patent: May 16, 1989

[54] THERMALLY STABLE POLYOXYALKYLENE HEAT TRANSFER FLUIDS

[75] Inventor: Edward M. Dexheimer, Grosse Ile, Mich.

[73] Assignee: BASF Corporation, Wyandotte, Mich.

[21] Appl. No.: 933,133

[22] Filed: Nov. 21, 1986

Related U.S. Application Data

[62] Division of Ser. No. 732,404, May 9, 1985, abandoned.

[51] Int. Cl.$^4$ .................. B05D 5/12; B23K 1/00; C09K 5/00
[52] U.S. Cl. .................. 228/180.1; 148/23; 228/242; 252/73; 564/305; 564/442; 564/443
[58] Field of Search .................. 252/73; 148/23; 228/180.1, 242, 260; 564/305, 442, 443; 568/583, 587, 608, 610

[56] References Cited

U.S. PATENT DOCUMENTS

| | | | |
|---|---|---|---|
| 4,059,218 | 11/1977 | Choby, Jr. | 228/207 |
| 4,334,646 | 6/1982 | Campbell | 228/180.2 |
| 4,360,144 | 11/1982 | Cuddy et al. | 148/23 |
| 4,376,868 | 3/1983 | Nield et al. | 568/608 |
| 4,588,840 | 5/1986 | Gurgiolo | 564/443 |
| 4,591,088 | 5/1986 | Mulliner et al. | 228/240 |

FOREIGN PATENT DOCUMENTS 3615092 11/1986 Fed. Rep. of Germany .

*Primary Examiner*—Robert Wax
*Attorney, Agent, or Firm*—William G. Conger

[57] ABSTRACT

Thermally stable polyoxyethylene polyethers prepared by oxyethylating aromatic initiators having at least two reactive hydrogens derived from amino or hydroxyl functional groups located para to each other are disclosed. These polyethers are especially suitable as solder bath oils, solder reflow oils, and heat transfer fluids for high temperature applications.

24 Claims, No Drawings

THERMALLY STABLE POLYOXYALKYLENE HEAT TRANSFER FLUIDS

This is a divisional application which claims priority to co-pending application Ser. No. 732,404, filed May 9, 1985, now abandoned.

BACKGROUND OF THE INVENTION

1. Field of the Invention

The subject invention relates to polyoxyethylene polyethers which are thermally stable at high temperatures. These polyethers find special utility as heat transfer fluids and soldering auxiliaries.

2. Description of the Related Art

In the past few decades the printed circuit board has evolved from a rare and expensive commodity to a virtually ubiquitous and inexpensive method of constructing electronic circuits. The development of the transistor, the accompanying miniaturization of other electronic components, and the increasing complexity of the circuits themselves has resulted in electronic circuits of high component density. Due to the high component density and the need for rapid, mass-production techniques, the technique of hand soldering components has largely been superseded by more modern and efficient soldering methods.

In the solder pot method, for example, the circuit board, the components mounted thereon, is partially immersed into a pot of molten solder, bonding the component leads to the foil conductors on the surface of the board. One of the disadvantages of the solder pot technique is the trapping of gas bubbles or debris under the surface of the board preventing the adherence of solder at these locations. A further disadvantage is the formation of an oxide coating, or dross, on the surface of the solder bath as a result of oxidation of the hot molten solder by atmospheric oxygen. The dross interferes with uniform soldering resulting in a high rejection rate of the finished boards.

In U.S. Pat. No. 2,740,193, an improvement to the pot soldering technique is disclosed wherein the previously soldered board is immersed into a second solder bath which is covered with a liquid layer of organophosphorus compound. This liquid, acting as a heat transfer fluid causes the solder to remelt. Agitation of the board in the heat transfer fluid and in the underlying solder bath enables the elimination of solder bridges between foil conductors. However, this procedure is less than satisfactory due to the high cost of the organophosphorus compound.

U.S. Pat. No. 3,054,174 describe the use of a high boiling fluid to bond leads to semi-conductor devices by immersing the devices with pre-positioned leads into the fluid. Suggested fluids are anhydrous lanolin, silicones, glycerine, ethylene glycol and polyethylene glycol. U.S. Pat. No. 3,214,827 discloses a process for soldering stacked printed circuit boards by immersion of the assembled, solder-coated components into a hot bath of fluid where solder reflow takes place. Corn oil is suggested as a suitable fluid.

U.S. Pat. No. 3,690,943 discloses the use of a stationary wave of heat transfer fluid to alloy two or more metals on a printed circuit board. The hot fluid, which may be selected from paraffins, fats, and mineral and vegetable oils, is pumped smoothly through a long but narrow orifice thereby forming a uniform wave of fluid. The previously metallized circuit board is passed through the wave at a speed appropriate to raise the temperature to a sufficient level so as to alloy the metals coated thereon.

The wave soldering technique has become quite important commercially. In wave soldering, a stationary wave of solder is formed in much the same manner as the wave of heat transfer fluid described in U.S. Pat. No. 3,680,943. The circuit board and mounted components are passed at a predetermined speed through the stationary wave of solder. The dross formed on the solder may be skimmed off as the solder is recirculated but nevertheless causes higher than desirable reject rates. To minimize dross and to decrease the number of unsoldered areas and solder bridges, thermally stable oils may be added to the wave soldering apparatus either in bulk or in continuously metered amounts. In addition to minimizing dross formation, these oils also have the advantage that they lower the surface tension of the solder, promoting more even solder coating.

All of the processes described above utilize a high temperature liquid, generally termed an "oil" irrespective of its actual composition. Regardless of the particular application, the oil must fulfill several, often conflicting requirements. First and foremost, it must have superior thermal properties. Among the thermal properties most desirable are high boiling point (and correspondingly low volatility), high smoke point, and in particular, high thermal stability with regard to common high temperature chemical reactions such as pyrolysis and oxidation. Further, it should not deposit appreciable amounts of resinous residue upon the circuit boards, or produce large amounts of such residue, or sludge, upon long-term use.

In addition to the thermal properties just mentioned, the oil should be non-reactive with the solder, the circuit board composition, and the electronic components. Finally, it is most desirable that the oil by easily and virtually completely removable by washing the inexpensive solvents, most preferably, water.

Polyoxyalkylene polyethers have been proposed for these uses. For example, polyoxyethylene glycols were proposed for use in U.S. Pat. No. 3,054,184, discussed previously. However, despite being relatively inexpensive and water rinseable, these polyethers suffer from low thermal stability and therefore have not been used to any appreciable extent. Alkylphenol oxyethylates have been utilized by the industry, but still do not have thermal stability of the degree desired. An oil of improved thermal stability was disclosed in U.S. Pat. No. 4,360,144. These improved oils are heteric polyoxyalkylene polyethers initiated with bisphenol A, containing a 1:3 ratio of oxyethylene and oxypropylene residues in the polyoxyalkylene chains. Although these materials constituted a considerable advance over oils previously available in terms of thermal stability, further improvement is desirable. Furthermore, the bisphenol A initiated polyethers had less than the optimal degree of rinseability.

SUMMARY OF THE INVENTION

It is therefore an object of the subject invention to provide a polyoxyalkylene polyether with superior thermal properties including high boiling point, high flashpoint and excellent thermal stability, combined with superior rinseability. Such a product is suitable for a variety of uses including, but not limited to, heat transfer fluids, solder reflow fluids, and wave soldering oils.

These and other objects were met by the preparation and use of polyoxyethylene polyethers initiated with an aromatic initiator molecule having two or more reactive hydrogens, wherein the active hydrogens are bonded to oxygen or nitrogen atoms located para to each other on the aromatic nucleus of the initiator molecule. These polyoxyalkylene polyethers possess excellent thermal properties and at the same time show excellent rinseability.

DESCRIPTION OF THE PREFERRED EMBODIMENTS

The thermally stable cogeneric polyoxyethylene polyethers of the subject invention have the formula

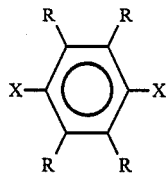

wherein each R radical is individually selected from the group consisting of hydrogen, fluoro, chloro, and lower alkyl having 1 to 4 carbon atoms, and wherein each X is individually selected from the group consisting of

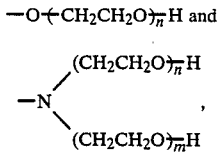

(a)

(b)

wherein n and m are integers greater than 2 such that the molecular weight of said polyether is from about 500 Daltons to about 10,000 Daltons.

These polyoxyalkylene polyethers are prepared by the ring-opening condensation polymerization of ethylene oxide onto a suitable initiator molecule. This process, generally referred to as oxyethylation, is generally accomplished through the use of catalysts. Lewis acid catalysts such as boron trifluoride etherate and aluminum chloride may be utilized as catalysts. Preferably, however, basic catalysts such as sodium or potassium hydroxides, or sodium or potassium lower alkoxides are utilized, in amounts of from about 0.01 to 10 percent by weight based on the initiator weight.

The oxyethylation is generally conducted at pressures greater than atmospheric and at temperatures of from 70° C. to 150° C., generally at about 105° to 135° C. The ethylene oxide may be added all at once, but it is preferable, for safety reasons, to add it gradually, or intermittently as previously added oxide reacts. It is possible to conduct the oxyethylation in the presence of minor amounts of higher alkylene oxides such as propylene oxide or butylene oxide to prepare a heteric copolymer polyether polyol. However, the thermal stability decreases with increasing content of the higher alkylene oxide, and thus it is desirable to minimize the amount of such higher alkylene oxide. Generally, more than 5 percent by weight significantly lowers the thermal stability. Preferably, the amount of higher alkylene oxide is 3 percent or less. Most preferably, no higher alkylene oxide is present.

The finished polyether, after discharging from the reactor, may be treated or neutralized to remove the residual catalyst. For example, the preferred basic catalysts may be removed by treatment with magnesium silicate, or they may be neutralized with inorganic acids such as phosphoric acid, or with organic acids such as acetic acid and salicylic acid.

Suitable initiators which may be used to prepare the polyoxyethylene polyethers of the subject invention are substituted and unsubstituted benzenoid hydrocarbons having hydroxyl and/or amino functional groups located para to each other on the aromatic ring. Suitable initiators, for example, are substituted or unsubstituted hydroquinones, p-phenylenediamines, and p-aminophenols. Particularly preferred are hydroquinone, p-phenylenediamine and p-aminophenol.

The initiators are oxyethylated until the average molecular weight is between 500 and 10,000 Daltons and preferably between 500 and 5000 Daltons. The most preferred polyoxyethylene polyethers of the subject invention have molecular weights between 600 and 2000 Daltons. Polyethers of the subject invention in the lower molecular weight range possess greater thermal stability than their higher molecular weight analogues. However the volatility of the lower molecular weight products is greater as well. For these reasons, polyethers having molecular weights of about 1000 Daltons are especially preferred.

In their use as heat transfer fluids, the polyethers of the subject invention may be used alone, in the form of mixtures, or in conjunction with other oils and additives. For example, the addition of nonylphenol oxyethylates to the subject polyoxyethylene polyethers allows the formulation of a less expensive product at some sacrifice of thermal stability and volatility. In general, it is not desirable to add more than 10 percent to 20 percent by weight of these less thermally stable polyethers to the polyoxyethylene polyethers of the subject invention.

Oxidation inhibitors such as phenothiazine may also be added to the subject polyoxyethylene polyethers to further enhance thermal stability. In general, from 0.1 percent to 1 percent by weight of inhibitor is added when such additional stabilization is desired. Soldering additives, especially those which promote the even flow of solder and/or chemically clean the metallic surface may also be used. Long chain alkanoic acids are frequently added for this purpose, for example, stearic acid and oleic acid. Oleic acid is preferred. The organic acid is added in relatively small quantities, generally less than 10 percent by weight, and preferably less than 7 percent by weight. Improved stability may also be achieved generally by neutralizing the alkaline oxyethylation catalyst with organic acids such as acetic acid and allowing the resulting carboxylic acid salts to remain in the finished product.

When desirable, inorganic salts or rosin acids may also be added. The addition of these more active cleaning agents is especially desirable if the polyoxyethylene polyethers of the subject invention are to be utilized in solder fluxes, particularly in automatic, continuous fluxing operations.

In the examples which follow, three polyoxyethylene polyethers of the subject invention, polyethers 1, 2, and 3, were synthesized and their properties compared to other polyoxyalkylene polyethers used in high temperature operations.

Polyethers 1 and 2 are cogeneric polyoxyethylene polyethers having average molecular weights of about 1400 and 800, respectively. These polyethers were prepared by oxyethylating bis(2-hydroxyethyl)hydroquinone with 30 and 14 moles of ethylene oxide in the presence of potassium hydroxide catalyst. The requisite amount of ethylene oxide was added at less than 90 psig at a temperature of 140° C. The finished polyethers were discharged, treated with magnesium silicate, filtered, and stripped for one hour at 125° C. and 10 torr. Polyether 2P differs from polyether 2 in containing 0.5 percent by weight of phenothiazine. Polyether 3 is an 800 average molecular weight cogeneric polyoxyethylene polyether prepared by oxyethylating p-phenylenediamine with 16 moles of ethylene oxide in the presence of potassium hydroxide catalyst. The method of preparation was similar to that utilized above.

Polyethers C-1 and C-1P, for comparison purposes, are commercially available solder bath oils which are nonylphenol oxyethylates prepared by oxyethylating nonylphenol with 10 moles of ethylene oxide in the presence of potassium hydroxide catalyst. Polyether C-1P differs from C-1 in being stabilized with 0.5 percent phenothiazine. Polyethers C-2 and C-2P, for comparison purposes, are commercially available polyethers which are butyl alcohol initiated heteric polyoxyethylene-polyoxypropylene copolymers having an average molecular weight of 4600 Daltons. Polyether C-2P differs from polyether C-2 in being stabilized with 0.5 percent phenothiazine. Polyether C-3 is a 1500 molecular weight polyoxyethylene polyether initiated with bisphenol A. Polyether C-4 is a 2000 molecular weight hydroquinone initiated heteric copolymer polyether containing 20 percent by weight of oxypropylene groups. Polyether C-5 is an 800 molecular weight polyoxyethylene polyether initiated with p-methylphenol.

TABLE I

| Polyether | Smoke Point, °C. |
| --- | --- |
| 1 | 214 |
| 2 | 279 |
| 2P | 283 |
| 3 | 226 |
| C-1 | 207 |
| C-2 | 185 |
| C-4 | 205 |
| C-5 | 170 |

Table I shows that the polyethers of the subject invention have smoke points which are considerably higher than comparable, commercially available polyethers.

The thermal stability of various polyoxyalkylene polyethers is presented in Table II. For short-term thermal stability testing, 3 grams of each polyether was added to a petri dish and maintained in a circulating air oven at 232° C. for three hours. For 24-hour tests, the same quantities of polyethers were added to metal pans and maintained in the circulating air oven at 240° C. for 24 hours. In each case the pan or dish was reweighed and the amount of polyether remaining expressed as a percentage of the initial amount. The thermal stability is proportional to the amount of polyether remaining.

An additional thermal stability test was devised to more clearly simulate behavior in bulk, as would occur in a solder bath or heat transfer fluid application. In this test, the so-called beaker test, a 40 gram sample was introduced into a beaker and maintained in a circulating air oven at 232° C. for 86 hours. The polyether remaining is expressed as a percentage of that originally introduced.

TABLE II

| Polyether | % Residue after 3 hrs. @ 232° C. | % Residue after 24 hrs. @ 240° C. | % Residue for Bulk Sample after 86 hrs. @ 232° C. |
| --- | --- | --- | --- |
| 1 | 99 | 55 | 91 |
| 2 | 99 | 51 | — |
| 2P | — | 57 | 92 |
| C-1 | 93 | 2.5 | 53 |
| C-1P | — | 5.0 | 61 |
| C-2 | 99 | 2.0 | 27 |
| C-2P | — | 2.0 | 22 |
| C-3 | 93 | 46 | — |
| C-4 | — | 13.0 | — |

Table II shows convincingly that the polyoxythylene polyethers of the subject invention have significantly improved thermal stability over prior art commercial products such as comparative polyether C-1 and the all polyoxyethylene analog to the polyether of U.S. Pat. No. 4,360,144.

Rinseability of various polyoxyalkylene polyethers is presented in Table III. To determine rinseability, a microscope slide was dipped into the liquid polyether, then dipped into water. The rinseability was measured by counting the number of seconds taken until clear upon visual inspection.

TABLE III

| Polyether | Rinseability, seconds |
| --- | --- |
| 1 | 2 |
| 2 | 2* |
| C-1 | 13 |
| C-2 | 39 |
| C-3 | 25 |

*best rinseability of all candidates tested.

Table III shows that products of the subject invention have superior rinseability as compared to prior art and commercial products.

The embodiments of the invention in which an exclusive privilege or property is claimed are defined as follows:

1. In a process for transferring heat by means of a fluid, the improvement comprising employing as a heat transfer fluid, a polyoxyalkylene polyether selected from the group consisting of:

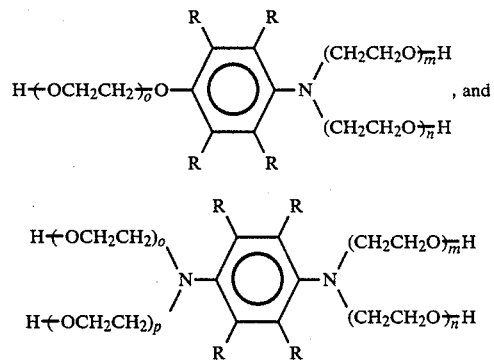

wherein each R radical is individually selected from the group consisting of hydrogen, fluoro, chloro, and lower alkyl having 1 to 4 carbon atoms, and wherein n, m, o, and p are integers greater than 2 such that the molecular weight of said polyether is from 500 Daltons to about 10,000 Daltons.

2. The process of claim 1 wherein the molecular weight of said polyether is from 500 Daltons to about 5000 Daltons.

3. The process of claim 1 wherein the molecular weight of said polyether is from 600 Daltons to about 2000 Daltons.

4. The process of claim 2 wherein each R is hydrogen.

5. The process of claim 4 wherein each R is hydrogen.

6. In a process for soldering printed circuit boards utilizing solder reflow wherein solder coated circuit boards having mounted thereon components to be soldered thereto are immersed in a heat transfer fluid whereupon the solder melts and flows, bonding said components to the board or to each other, the improvement comprising employing as the solder reflow heat transfer fluid, a polyoxyethylene polyether having a formula selected from the group consisting of:

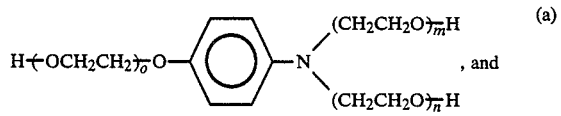 , and

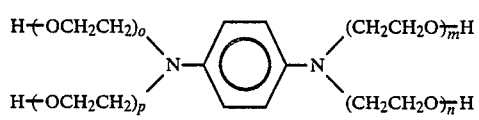

wherein n, m, o, and p are integers greater than 2 such that the average molecular weight of said polyether is from 600 Daltons to about 2000 Daltons.

7. In a process for transferring heat by means of a fluid, the improvement comprising employing as a heat transfer fluid a polyoxyethylene polyether having the formula

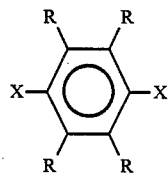

wherein each R radical is individually selected from the group consisting of hydrogen, fluoro, chloro, and lower alkyl having 1 to 4 carbon atoms, and wherein each X is individually selected from the group consisting of —O(CH₂CH₂O)ₙH and        (a)

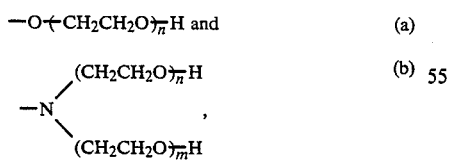

wherein n and m are integers greater than 2 such that the molecular weight of said polyether is from about 500 Daltons to about 10,000 Daltons.

8. The process of claim 7 wherein each R is hydrogen.

9. The process of claim 7 wherein said molecular weight is from 500 Daltons to 5000 Daltons.

10. The process of claim 8 wherein said molecular weight is from 500 Daltons to 5000 Daltons.

11. The process of claim 7 wherein said molecular weight is from 600 Daltons to 2000 Daltons.

12. The process of claim 8 wherein said molecular weight is from 600 Daltons to 2000 Daltons.

13. In a process for wave soldering printed circuit boards wherein an oil is added to the molten solder, the improvement comprising employing as an oil, a polyoxyethylene polyether having the formula

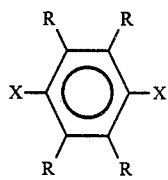

wherein each R radical is individually selected from the group consisting of hydrogen, fluoro, chloro, and lower alkyl having 1 to 4 carbon atoms, and wherein each X is individually selected from the group consisting of

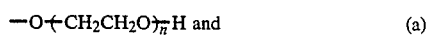

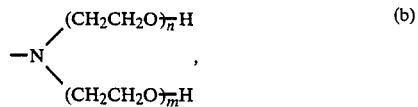

wherein n and m are integers greater than 2 such that the molecular weight of said polyether is from about 500 Daltons to about 10,000 Daltons.

14. The process of claim 13 wherein each R is hydrogen.

15. The process of claim 13 wherein said polyether has a molecular weight of from 500 to 5000 Daltons.

16. The process of claim 13 wherein said polyether has a molecular weight of from 600 to 2000 Daltons.

17. In a process for soldering printed circuit boards utilizing solder reflow wherein solder coated circuit boards having mounted thereon components to be soldered thereto are immersed in a heat transfer fluid whereupon the solder melts and flows, bonding said components to the board or to each other, the improvement comprising employing as the solder reflow heat transfer fluid, a polyoxyethylene polyether having the formula

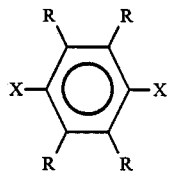

wherein each R radical is individually selected from the group consisting of hydrogen, fluoro, chloro, and lower alkyl having 1 to 4 carbon atoms, and wherein each X is individually selected from the group consisting of

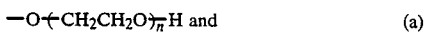

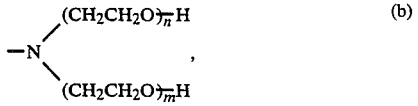

wherein n and m are integers greater than 2 such that the molecular weight of said polyether is from about 500 Daltons to about 10,000 Daltons.

18. The process of claim 17 wherein each R is H.

19. The process of claim 17 wherein said molecular weight is from about 500 Daltons to 5000 Daltons.

20. The process of claim 17 wherein said molecular weight is from about 600 Daltons to 2000 Daltons.

21. In a solder flux utilizing one or more inorganic or organic cleaning agents, the improvement comprising utilizing as one component, a polyoxyethylene polyether having the formula

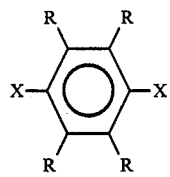

wherein each R radical is individually selected from the group consisting of hydrogen, fluoro, chloro, and lower alkyl having 1 to 4 carbon atoms, and wherein each X is individually selected from the group consisting of

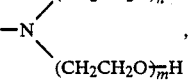

(a)

(b)

wherein n and m are integers greater than 2 such that the molecular weight of said polyether is from about 500 Daltons to about 10,000 Daltons.

22. The flux of claim 21 wherein each R is H.

23. The flux of claim 21 wherein said molecular weight is from 500 to 5000 Daltons.

24. The flux of claim 21 wherein said molecular weight is from 600 to 2000.

* * * * *